United States Patent
Rodriguez De Castro et al.

(10) Patent No.: US 10,591,966 B1
(45) Date of Patent: Mar. 17, 2020

(54) ACTIVELY CONTROLLED SERIES STRING POWER SUPPLY

(71) Applicant: Blockchain ASICs LLC, San Francisco, CA (US)

(72) Inventors: Edward L. Rodriguez De Castro, San Francisco, CA (US); Sagar V. Reddy, Sunnyvale, CA (US)

(73) Assignee: Blockchain ASICS LLC, San Francisco, CA (US)

(*) Notice: Subject to any disclaimer, the term of this patent is extended or adjusted under 35 U.S.C. 154(b) by 0 days.

(21) Appl. No.: 16/280,910

(22) Filed: Feb. 20, 2019

(51) Int. Cl.
| | |
|---|---|
| *G06F 1/26* | (2006.01) |
| *H02M 3/158* | (2006.01) |
| G06F 21/72 | (2013.01) |
| H02J 1/10 | (2006.01) |
| H02J 1/08 | (2006.01) |
| H02M 1/00 | (2006.01) |
| H02M 3/335 | (2006.01) |
| H05B 45/375 | (2020.01) |

(52) U.S. Cl.
CPC .............. *G06F 1/26* (2013.01); *H02M 3/158* (2013.01); *G06F 21/72* (2013.01); *H02J 1/082* (2020.01); *H02J 1/102* (2013.01); *H02M 3/33561* (2013.01); *H02M 2001/009* (2013.01); *H02M 2001/0074* (2013.01); *H05B 45/375* (2020.01)

(58) Field of Classification Search
CPC ... H02M 2001/0074; H02M 2001/008; H02M 2001/009; H02M 3/158; G06F 1/26–3296; H05B 33/0815
See application file for complete search history.

(56) References Cited

U.S. PATENT DOCUMENTS

| | | | | | |
|---|---|---|---|---|---|
| 5,886,508 | A | * | 3/1999 | Jutras | ...................... G05F 1/577 323/267 |
| 7,982,443 | B1 | * | 7/2011 | Baba | ...................... H02M 3/158 323/271 |
| 2006/0284490 | A1 | * | 12/2006 | Kumar | .................. H02M 3/158 307/82 |
| 2009/0033289 | A1 | * | 2/2009 | Xing | ..................... H02J 7/0065 320/140 |

(Continued)

*Primary Examiner* — Rexford N Barnie
*Assistant Examiner* — David A Shiao
(74) *Attorney, Agent, or Firm* — Schwegman Lundberg & Woessner, P.A.

(57) ABSTRACT

An apparatus, method, and system for actively controlling power in a series string load is provided. A number of conventional low-cost power supply units energize a number of voltage-regulation modules (VRMs) connected to each other in series. Each VRM generates a regulated output voltage using a pulse-wave modulated switching circuit, and provides the regulated output voltage to a number of load elements. Each VRM also sends signals to a central controller describing the output voltage applied to its connected load elements, and adjusts the output voltage applied to its connected load elements in response to signals received from the central controller. The supply voltage provided to individual load elements may thus be accurately and dynamically controlled during operation. Each load element may comprise a light-emitting device, a microprocessor, or a cryptographic integrated circuit with a plurality of processing cores. Optocouplers or load-shifters send signals across different supply voltage domains.

24 Claims, 14 Drawing Sheets

(56) References Cited

U.S. PATENT DOCUMENTS

| | | | |
|---|---|---|---|
| 2013/0020951 A1* | 1/2013 | Pollock | H05B 33/0809 |
| | | | 315/186 |
| 2014/0053004 A1* | 2/2014 | Chang | G06F 1/26 |
| | | | 713/300 |
| 2014/0097685 A1* | 4/2014 | Jun | H02H 7/10 |
| | | | 307/31 |
| 2016/0018869 A1* | 1/2016 | Raghavan | G06F 1/3228 |
| | | | 713/320 |
| 2016/0301305 A1* | 10/2016 | Yamada | H02M 3/156 |
| 2017/0331371 A1* | 11/2017 | Parto | H02M 3/156 |
| 2017/0364132 A1* | 12/2017 | Gendler | G06F 1/324 |
| 2018/0062495 A1* | 3/2018 | Xu | H02M 3/00 |
| 2018/0095932 A1* | 4/2018 | Rajwan | G06F 1/3228 |

* cited by examiner (PRIOR ART)

ACTIVELY CONTROLLED SERIES STRING POWER SUPPLY

RELATED APPLICATIONS

This application is related by subject matter to commonly-assigned U.S. Pat No. 16/280,968 filed on even date herewith and entitled "Performance Sensitive Series String Power Supply", which is hereby incorporated by reference in its entirety.

TECHNICAL FIELD

The disclosed technology relates generally to regulated direct current (dc) power supplies, and more particularly, to regulated dc power supplies that provide actively controlled supply voltages to each individually variable electrical load element in a series string.

BACKGROUND

Many electronic systems use a series string power supply architecture. The basic concept is that a fixed-voltage variable-current dc power supply unit (PSU) producing a relatively high output voltage is connected to the power plane of the first load element in the series string, and the ground plane of the first load element is then connected to the power plane of a second load element. This stair-step supply voltage arrangement may be repeated multiple times, with the final load element's ground plane being connected back to the PSU's ground plane, thus completing the circuit. See FIG. 1.

The series string architecture provides an inexpensive but rather inflexible voltage regulation mechanism. That is, the voltage across the entire series string is necessarily equal to the voltage provided by the PSU, but the voltage across any individual load element in the series string may fluctuate. Individual load voltages may be determined by simple voltage division while the series string current remains constant. In some use scenarios, all the load elements in the series string may be identical, in which case the voltage across any one load element is simply the PSU voltage divided by the number of load elements in the series string.

Microprocessors have been increasing in sophistication over time, and now often feature multiple processor cores on a single integrated circuit die. Newer microprocessors generally require lower power supply voltages than older microprocessors. This supply voltage reduction is largely due to the smaller transistors from which today's microprocessors are manufactured, and the higher speeds at which those transistors are required to change states. A series string of several modern microprocessors may theoretically be powered by a supply voltage that once powered a smaller number of microprocessors in the past. Similar changes are occurring in the lighting field, where a supply voltage that once powered a small number of incandescent bulbs can now power a larger number of high-efficiency light-emitting diodes in a series string.

The inability of the simple series string architecture to precisely control individual load voltages may cause problems when the load elements are more dynamic in their behavior. This is typically the case with computing devices, such as microprocessors or processor cores (and may also sometimes occur with lighting devices). The effective electrical resistance of an individual computing load element may vary substantially, both statically due to normal variances in its electrical characteristics and dynamically due to its computational activity level. Active processors typically draw more current than inactive processors, so have a lower effective electrical resistance as seen by a power supply. Since the current flowing in the series string is the same for all individual load elements, fluctuations in any load element's effective resistance may lead to fluctuations in all of the individual load element supply voltages.

The conventional series string architecture may therefore be inadequate for the supply voltage sensitivities of series strings that include particularly dynamic load elements. Modern microprocessors may not function properly when their individual supply voltages vary significantly, for example, due to changes in the activity level of one or more load elements in the series string. Uncontrolled changes in the supply voltage across any given load element in the series string could cause load element damage or even failure of the entire series string.

The present inventors therefore seek to solve the technical problem of precisely yet inexpensively powering a number of electrical load elements that are connected in series. This problem arises in several different scenarios, including but not limited to powering a plurality of microprocessors in a computer system or a plurality of light-emitting devices in a lighting appliance as previously noted. The problem is also important in blockchain processing, such as in cryptocurrency management, where engineers seek to minimize overall power consumption for a variable computational workload performed by a potentially large number of processing cores that may be distributed across multiple integrated circuits.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE EMBODIMENTS

Embodiments of the technology disclosed herein are directed toward improved architectures for distributing power from at least one PSU to a series string load. More particularly, various embodiments of the technology disclosed herein relate to controlling the supply voltage applied to each load element in the series string. This feature is of particular utility when that load element's effective equivalent resistance may vary with time. Embodiments of the technology disclosed herein solve the technical problem of precisely yet inexpensively powering a number of electrical load elements that are connected in series.

Figure 1:
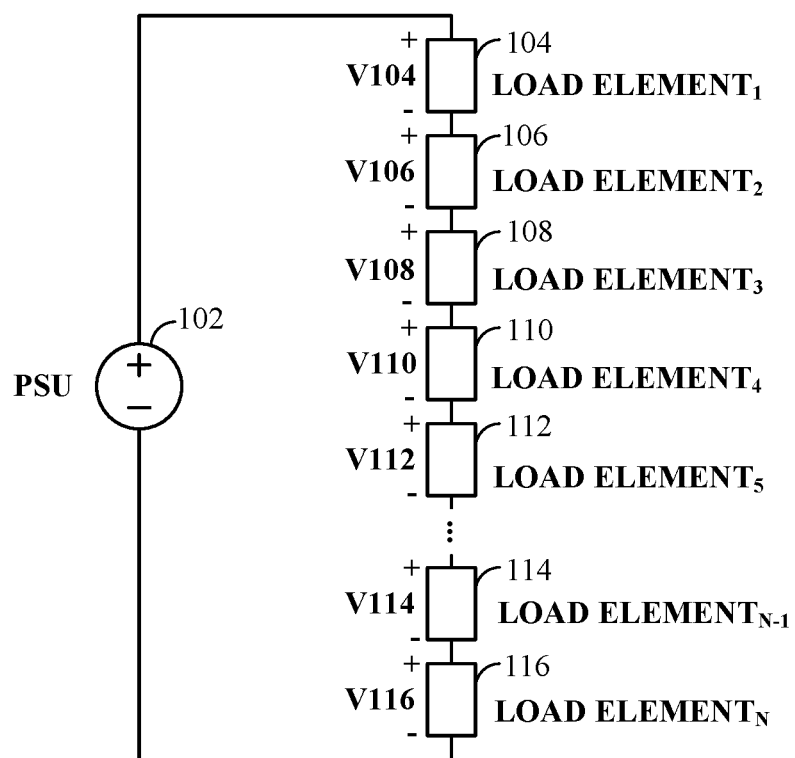
FIG. 1 shows a circuit diagram of a prior art series string architecture.

FIG. 1 shows a circuit diagram of a prior art series string architecture 100. The PSU 102 is generally powered by an alternating voltage provided from mains electricity (not shown) and produces a fixed dc output voltage at up to a specified maximum rated output current. Conventional PSUs, long used in personal computers, have become quite inexpensive due to the economies of scale available with mass production. The typical Advanced Technology eXtended standard (ATX) type PSU outputs up to twelve Volts dc, with a maximum output current of perhaps forty Amperes. Any other dc fixed-voltage variable current power sources may also be used.

The PSU 102 powers a series string electrical load comprising an exemplary set of load elements 104 through 116 connected to each other in series and connected to the PSU 102. Any number of load elements may be present, and the load elements may comprise any type of electrical load. For example, a load element may comprise a microprocessor, a light-emitting device such as a light-emitting diode, or a cryptographic application-specific integrated circuit (ASIC) with a number of processor cores, or any combinations thereof, in various different embodiments.

The output voltage provided by the PSU 102 is distributed across load elements 104 through 116, with each load element receiving some voltage across its terminals as shown. Load element voltages V104 through V116 of course add up to the provided the PSU 102 voltage. However, since there is a common electrical current flowing from the PSU 102 through all the load elements 104 through 116, the individual load voltages will be proportional to the relative effective resistance of each load element to the total effective resistance of the entire series string load. In the particular case where each load element has an identical resistance, each load element voltage will simply be the PSU 102 output voltage divided by the total number of load elements.

Figure 2:
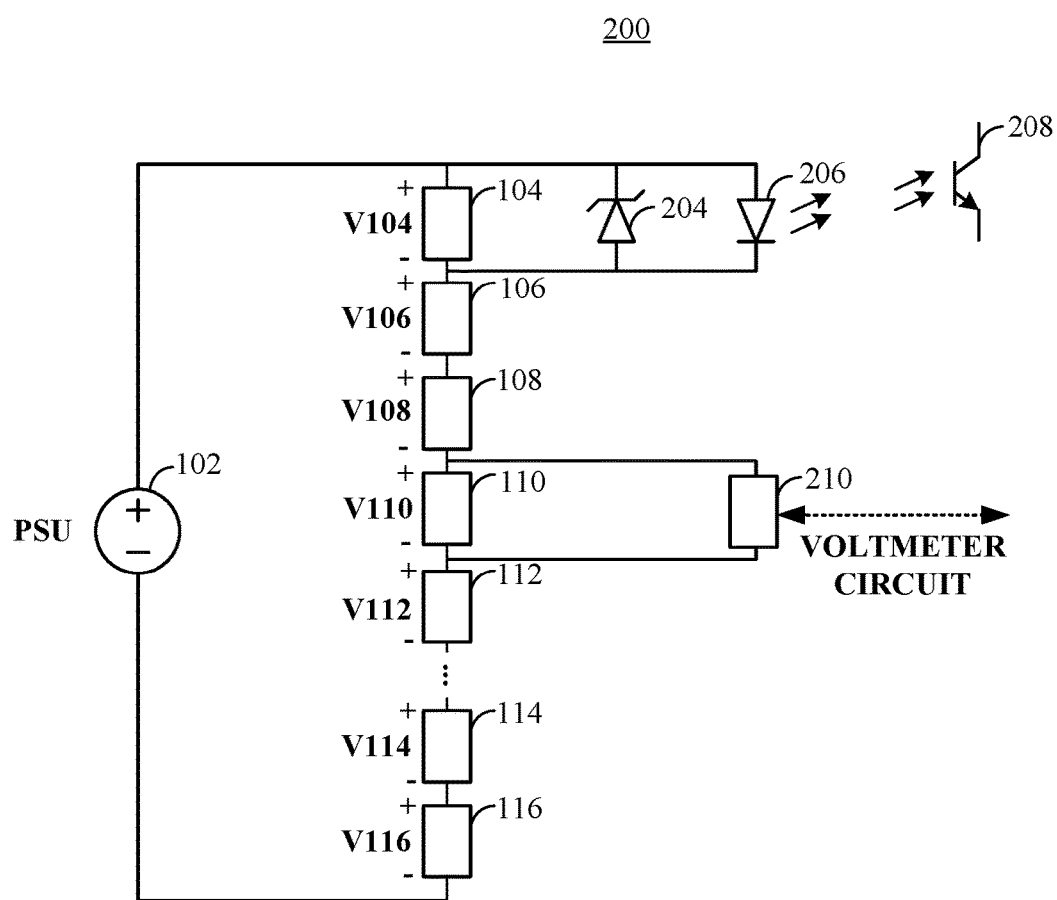
FIG. 2 shows a circuit diagram of a revised series string architecture, according to an embodiment.

FIG. 2 shows a circuit diagram of a revised series string architecture 200, according to an embodiment. This architecture augments at least one load element, such as 104 as shown here, to further comprise overvoltage protection circuitry and/or voltage monitoring and communication circuitry. The overvoltage protection circuitry may comprise a voltage limiter that prevents the voltage across a given load element from exceeding a predetermined value.

A Zener diode 204, for example, may begin to conduct current at a selected reverse bias voltage, so the series string supply current will be increasingly shunted through the Zener diode 204 rather than through the rest of the respective load element (104 in this case). The Zener diode 204 thus limits the voltage V104 that can exist across load element 104. Other overvoltage protection circuitry as may be familiar to one of ordinary skill in the art may be provided for each load element.

The voltage monitoring circuitry may produce an output signal indicating the voltage across a respective load element. For example, a light-emitting diode (LED) circuit 206 may generate illumination that varies with the voltage applied to load element 104. An optical receiver circuit, for example, comprising a photodiode or phototransistor 208 may measure this illumination to discern voltage V104.

Such an optocoupler, comprising any light source and any light-sensitive receiver, is a simple means for communicating information across different voltage domains without bulky and expensive blocking capacitors. Other communication circuitry is possible, such as level-shifting circuits of various types as may be known in the art that can send signals across different voltage domains.

This simple analog voltage monitoring circuit example may suffice for some applications, but other embodiments may use more sophisticated voltage signaling circuitry. For example, a voltmeter circuit 210 may be used to measure the voltage across a given load element such as V110, without drawing significant current.

The voltage across a load element may be measured with respect either to the negative terminal of the load element (as shown) or to ground. Designers may choose to view each load voltage is comprising its own voltage domain, and always work in terms of the local supply voltage.

The voltmeter circuit 210 output may be encoded for transmission to other portions of the series string architecture. In this fashion, the voltage provided to each load element may be at least reported out, shown via the dashed line.

Other monitoring circuitry may report out other data regarding the load element, such as its operating frequency, operating temperature, etc. Any messaging format may be used for such communications.

Figure 3:
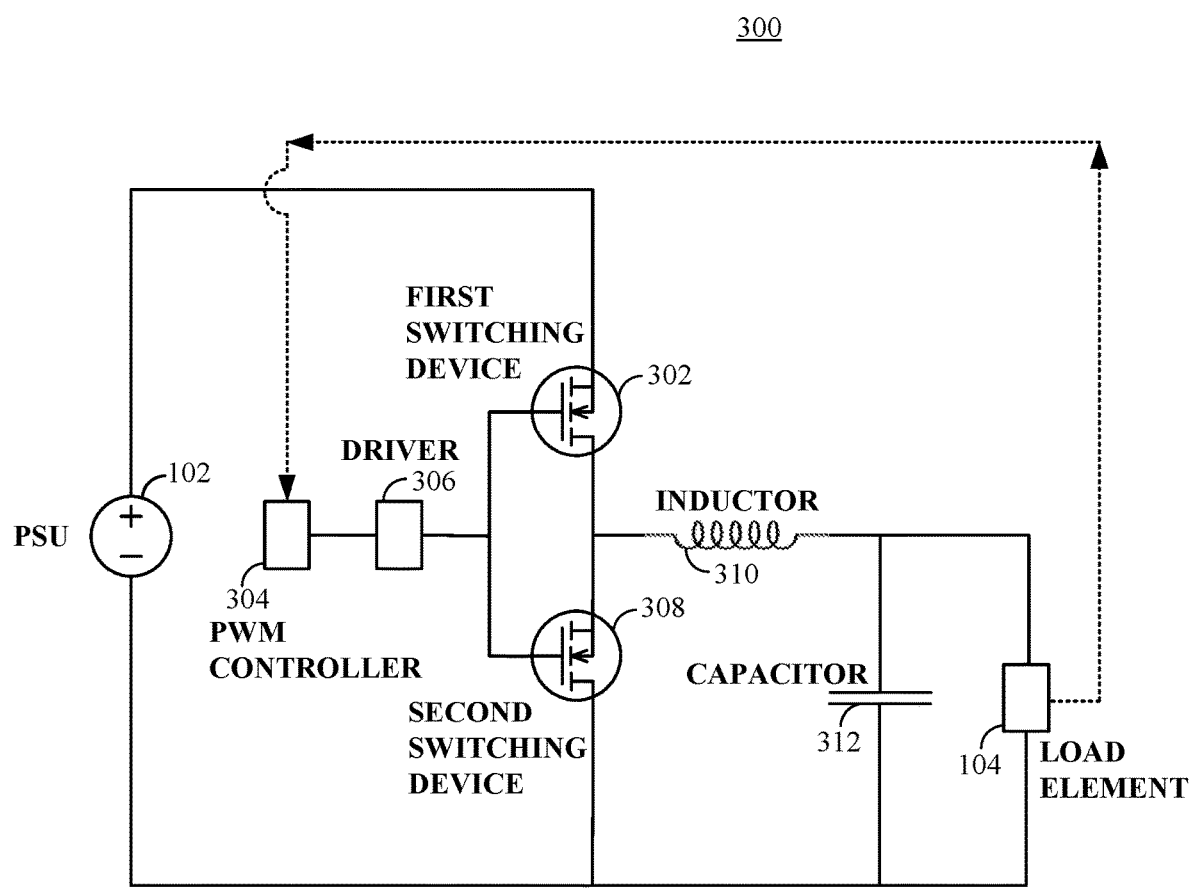
FIG. 3 shows a circuit diagram of a voltage regulation module (VRM), according to an embodiment.

FIG. 3 shows a circuit diagram of a VRM 300, according to an embodiment. The PSU 102 is connected to a first switching device 302, which is a metal-oxide-semiconductor field-effect transistor (MOSFET) in this non-limiting example. A pulse width modulation (PWM) controller 304 is connected to a driver circuit 306.

The driver circuit 306 is connected to the inputs of the first switching device 302 and a second switching device 308, which is also a MOSFET in this example. The current provided by PSU 102 and transferred by the first switching device 302 and, at other times by the second switching device 308, drives an inductor 310, which induces an output voltage. A capacitor 312 and the load element 104 are connected across the output voltage of the VRM 300.

The load element 104 may be equipped with a voltage monitoring circuit, as previously described, that may send a signal to the PWM controller 304 indicating the output voltage being applied (shown via the dashed line). In response, the PWM controller 304 may alter its output, in terms of frequency and/or duty cycle, which drives the switching of the inductor 310 by the switching devices 302 and 308. The result is that the output voltage of the VRM 300 may be adjusted toward a target value stored in the PWM controller 304. The target value may also be externally provided to each VRM 300 in some embodiments.

Note that the load element 104, the capacitor 312, and the second switching device 308 have ground planes that are joined together and connected to the ground plane of the PSU 102. For simplicity, the circuit diagram illustrates a single-phase VRM 300, but in practice VRMs may use more than one phase (with each phase having its own separate combination of a driver circuit 306, a first switching device 302, a second switching device 308, an inductor 310, and a capacitor 312).

Figure 4:
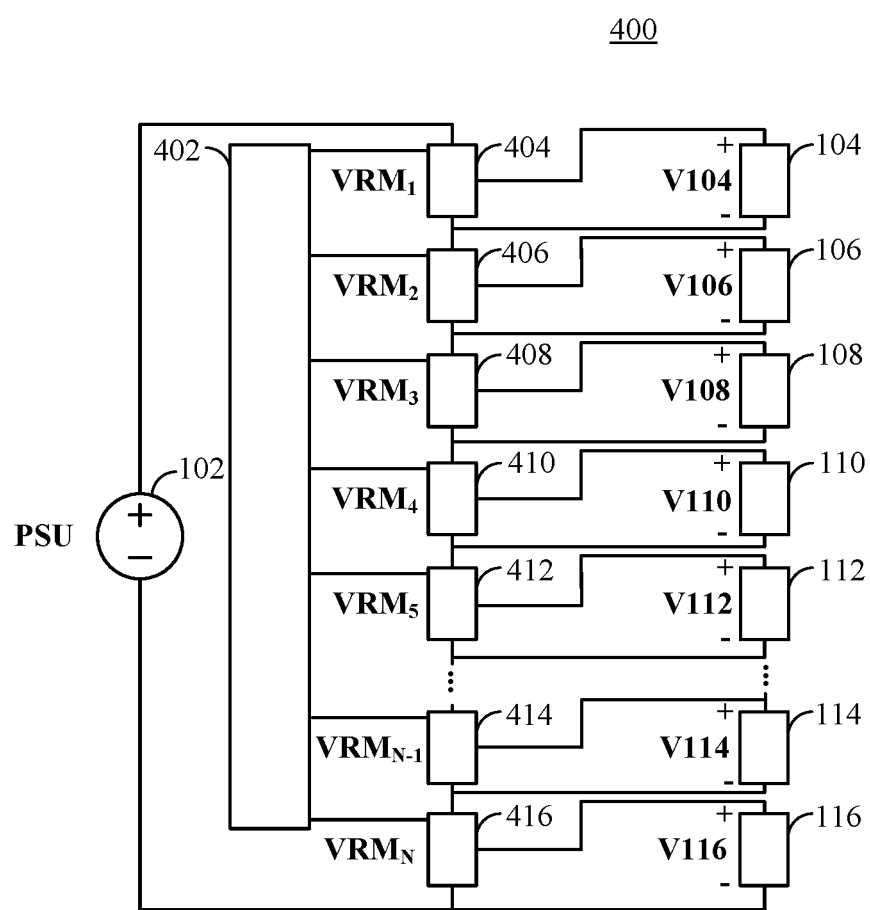
FIG. 4 shows a circuit diagram of a series string architecture with one VRM per load element, according to an embodiment.

FIG. 4 shows a circuit diagram of a series string architecture 400 with one VRM (404 through 416) per load element, according to an embodiment. Each VRM (e.g., 404) may receive power from the PSU 102 and provide a selected output voltage (e.g., V104). Each VRM may include an independent voltage regulator circuit that controls the output voltage that it provides.

Alternatively, a central controller 402 may actively control the VRMs 404 through 416. The central controller 402 may receive signals indicative of the particular output voltage reported by particular monitored load elements as previously described. The central controller 402 may then responsively transmit signals to a particular VRM to direct that VRM to adjust its output voltage to precisely match a stored target voltage.

In a multiprocessor computer system, this approach provides direct and accurate control over the voltage supplied to each individual processor load element. This control is provided regardless of variance in its intrinsic electrical characteristics, its level of activity at any given time, and the intrinsic characteristics and/or activity levels of other nearby processors. Note that in some embodiments the central controller 402 may be replaced by a number of separate controllers.

Figure 5:
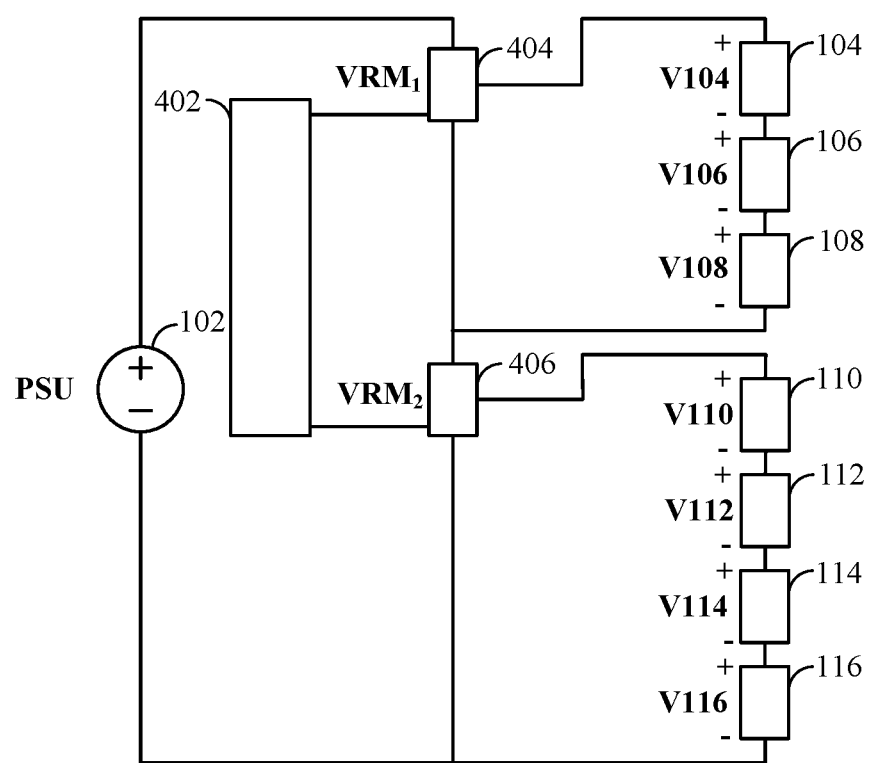
FIG. 5 shows a circuit diagram of a series string architecture with one VRM per multiple load elements, according to an embodiment.

FIG. 5 shows a circuit diagram of a series string architecture 500 with one VRM 404 and 406) per multiple load elements, according to an embodiment. In some cases, the use of one VRM per load element is overkill, leading to unnecessary costs. Therefore, this embodiment is believed to be the best mode of implementation.

Each VRM may instead manage a number of load elements in series, in a sub-string so to speak. The number of manageable load elements may vary according to the output voltage produced by the VRM, the range of supply voltages acceptable by each load element, and the variation in effective load resistance of each load element. In one example, four microprocessors 110-116 may be powered by a single VRM 404 and each microprocessor will be provided with an acceptable supply voltage in spite of the activity level of the set of microprocessors.

Figure 6:
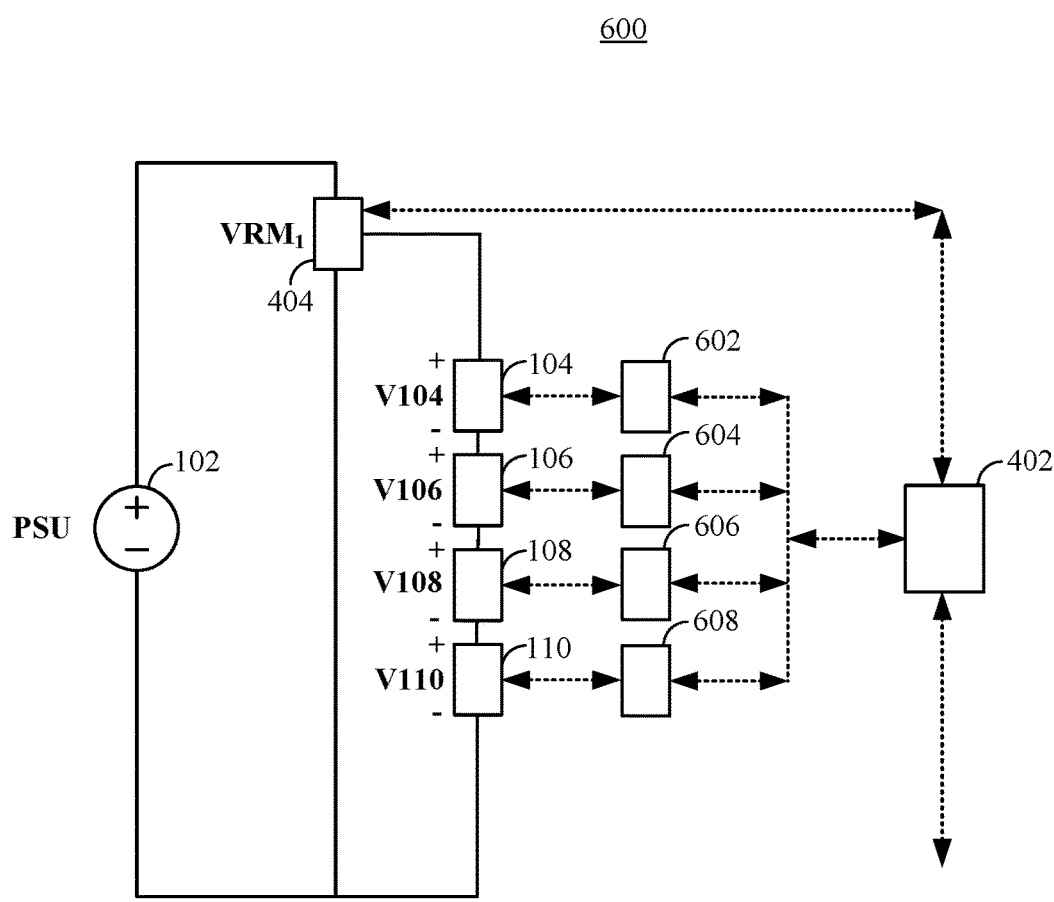
FIG. 6 shows a circuit diagram of a series string architecture with a central controller and optocouplers, according to an embodiment.

FIG. 6 shows a circuit diagram of a series string architecture 600 with a central controller 402 and optocouplers 602-608, according to an embodiment. As previously described, the optocouplers may send signals indicative of the voltage supplied to each load element to corresponding receiver circuits in the central controller 402 (shown via the dashed arrows). The central controller 402 may responsively send signals to the VRM 404, causing the VRM 404 to adjust its output voltage.

However, in this embodiment the optocouplers 602-608 may also receive information from the central controller 402 and transmit such information to the load elements. Such information may arise from the VRM 404, perhaps as an advance notice that the supply voltage is going to change, which might cause a processor to suspend operations temporarily for example. Such information may also come from outside the system, perhaps to provide notice to the load elements that their computational workload is going to change or even end. In some embodiments, level-shifting circuits may replace the optocouplers, as previously described.

Figure 7:
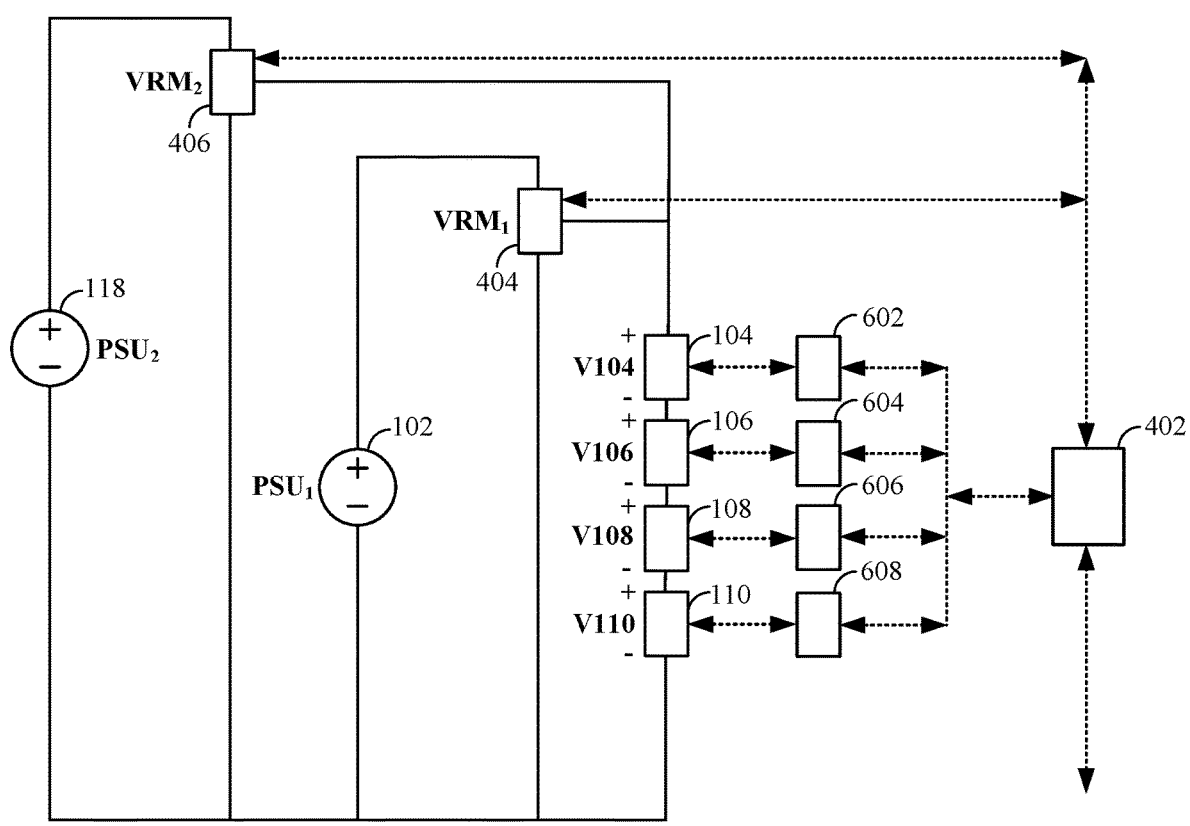
FIG. 7 shows a circuit diagram of a series string architecture with multiple PSUs and multiple VRMs, according to an embodiment.

FIG. 7 shows a circuit diagram of a series string architecture 700 with multiple PSUs and multiple VRMs, according to an embodiment. This embodiment is identical to that of FIG. 6, except that a second PSU 118 and a second VRM 406 also contribute to providing power to the load elements. The PSUs and VRMs share a common ground plane. This embodiment may thus provide increased supply current to the overall series string load. As with the FIG. 6 embodiment, the central controller 402 may coordinate communications to and from the VRMs and the load monitoring circuitry.

The cost of a given PSU tends to increase when a higher than usual maximum rated output current is specified. A system that uses more than one inexpensive PSU to supply a larger current to a load might thus prove cheaper than a system that requires a single custom higher-current PSU. Unfortunately, direct interconnection of multiple PSUs can easily lead to circuit failure. Mismatches in PSU output voltages will often lead to one PSU producing excessive current and/or causing back-feed damage to another PSU.

This embodiment is free from such shortcomings. Each PSU (102 and 118) powers its own VRM (404 and 406); each VRM serves to isolate its PSU from fluctuations in individual load element effective resistances and thus the overall voltage provided to the series string load. Each VRM is responsive to the central controller 402, setting the output voltage it commands, so the architecture is dynamically stable overall.

The PSUs are therefore each less likely to be tasked with providing more than rated output current. There is also no direct connection between the two PSUs, so problems of back-feed due to one PSU providing an overvoltage to the other PSU are reduced. There is no theoretical limit to the number of separate PSUs or VRMs that can be brought to bear upon a load. The central controller 402 may therefore turn on or off VRMs as required. The central controller 402 may communicate with the external world via any messaging protocols, such as Ethernet, USB, serial, etc.

Figure 8:
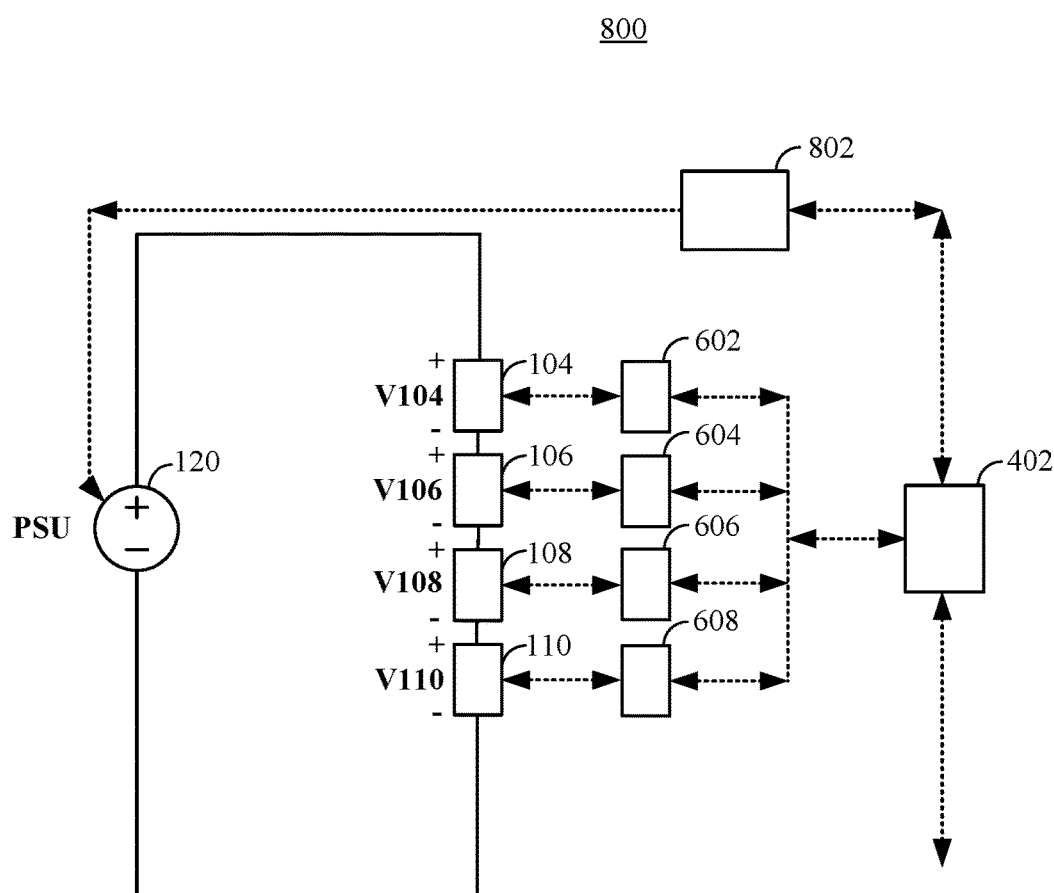
FIG. 8 shows a circuit diagram of a series string architecture that does not require a VRM, according to an embodiment.

FIG. 8 shows a circuit diagram of a series string architecture 800 that does not require a VRM, according to an embodiment. This embodiment instead uses a single controllable PSU 120 and bidirectional control lines connecting the central controller 402 to the PSU 120 via a sense line adapter 802. The sense line adapter 802 enables the central controller 402 to vary the voltage supplied by the PSU 120 to some extent. In one embodiment, the controllable PSU 120 may comprise a PWM controller with controllable frequency and/or duty cycle to this end, though any means available to adjust the output voltage of the PSU 120 may be employed.

Figure 9:
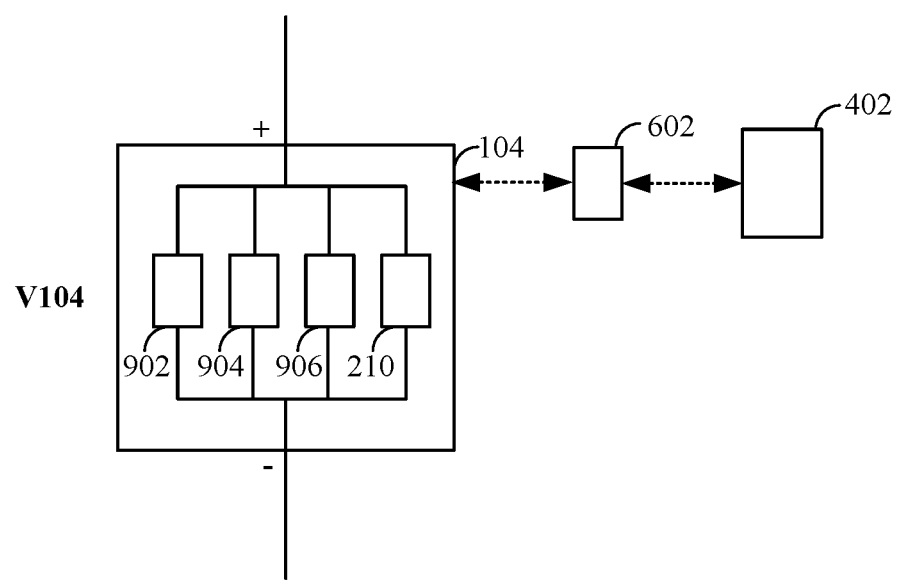
FIG. 9 shows a circuit diagram of a load element comprising a number of processor cores, according to an embodiment.

FIG. 9 shows a circuit diagram of a load element comprising a number of processor cores, according to an embodiment. This figure is a zoomed portion of the previous embodiments shown in FIGS. 6 through 8, but for a particular type of load element. Exemplary load element 104 may comprise a number of independent and separately controllable processing cores 902-906 connected in parallel. Load element 104 may also comprise its own voltmeter circuit 210 that may report out the supply voltage V104. Other monitoring circuits in each load element 104 may report out other aspects of each processor core's operations, including but not limited to its operating temperature, clock rate, memory status, etc.

The effective electrical resistance of the load element 104 may be both monitored and controlled by the central controller 402 previously described. The central controller 402 may compare the voltage drop V104 across load element 104 to the voltage drop across the remainder of the series string. The central controller 402 may alter global settings across the entire series string (e.g., processor clock speeds) and/or may disable or enable individual processing cores among the group 902-906 to increase or decrease the effective load element 104 resistance.

The same general approach may be applied to other processor cores in other load elements in the series string. The central controller 402 may thus dynamically control not just the voltage across the entire string by interacting with a VRM, but also by individually monitoring and controlling up to each portion of each load element.

Figure 10:
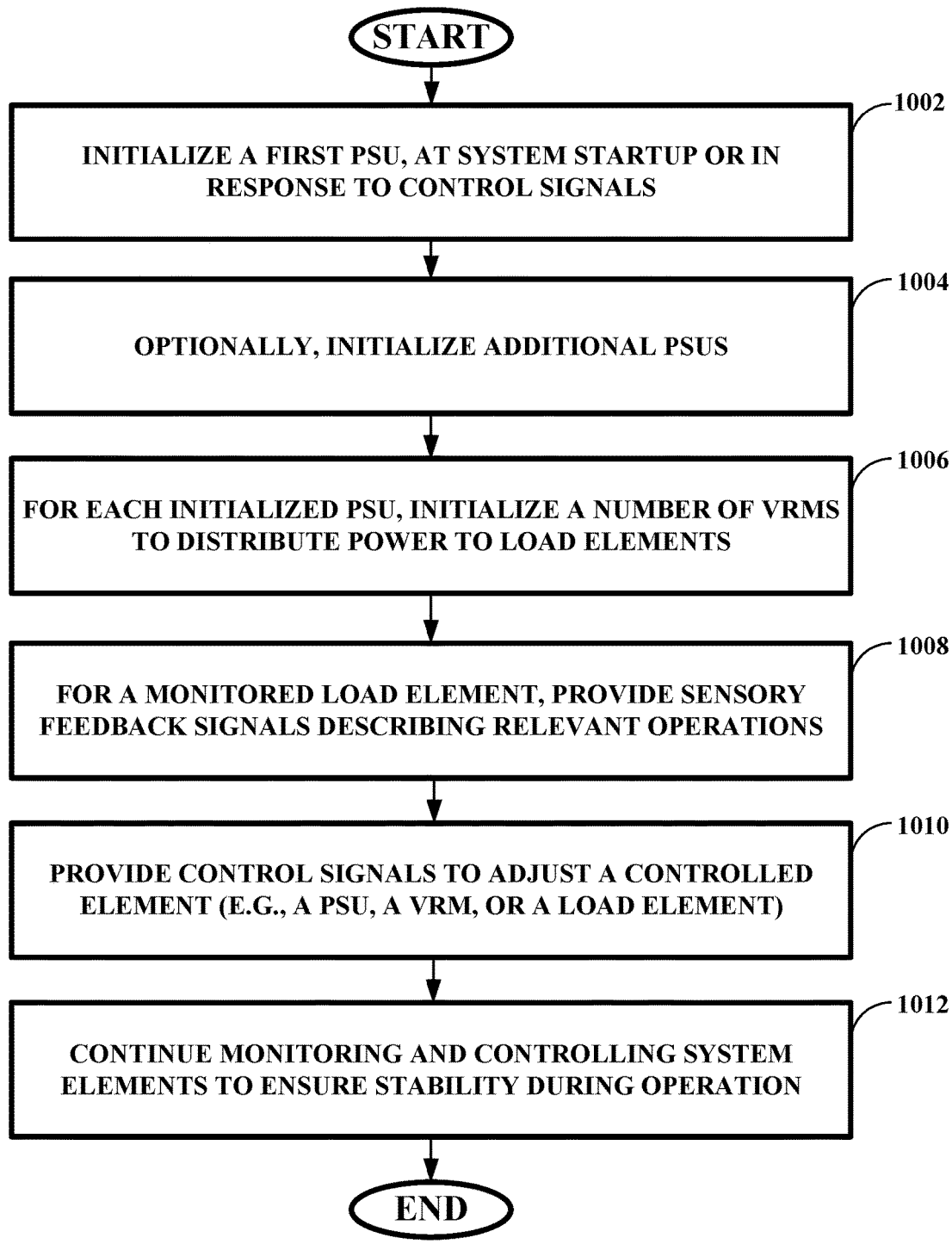
FIG. 10 shows a flowchart of a power management methodology, according to an embodiment.

FIG. 10 shows a flowchart of a power management methodology 1000, according to an embodiment. At 1002, a system may initialize a first PSU, in response to system startup or in response to control signals. At 1004, the system may initialize additional PSUs as needed to provide sufficient power to a load; this step is optional.

At 1006, for each initialized PSU, the system may initialize a number of VRMs powered by that PSU. In some embodiments with adjustable PSUs, no VRMs may be required, while in other embodiments multiple VRMs may be powered by a particular PSU. Each VRM may power a single load element, or a series string of load elements.

Note that multiple VRMs may provide power to a common load. The load is typically a series string of individual load elements. Each load element may comprise any number of individual power-consuming components, such as a light-emitting device, a microprocessor core, or a cryptographic ASIC with a number of processor cores.

At 1008, for each monitored load element, the system may provide sensory feedback signals. The feedback signals may be communicated to a central controller or to any number of separate controllers. Feedback signals may originate in monitoring circuitry and be communicated to via optocouplers or level-shifting circuitry, for example. Feedback signals may describe voltages supplied to individual load elements, or other relevant operational information.

At 1010, the system may provide control signals to a controlled element, which may comprise a PSU, a VRM, or a load element, for example. Control signals may be provided using a central controller, or a number of separate controllers.

At 1012, the system may continue monitoring and controlling system elements as operations vary, to maintain system stability while the system is operational. Operations may vary with temperature, component aging, computational workload changes, and/or the cost of electrical power. The method may end at system shutdown, for example.

Figure 11:
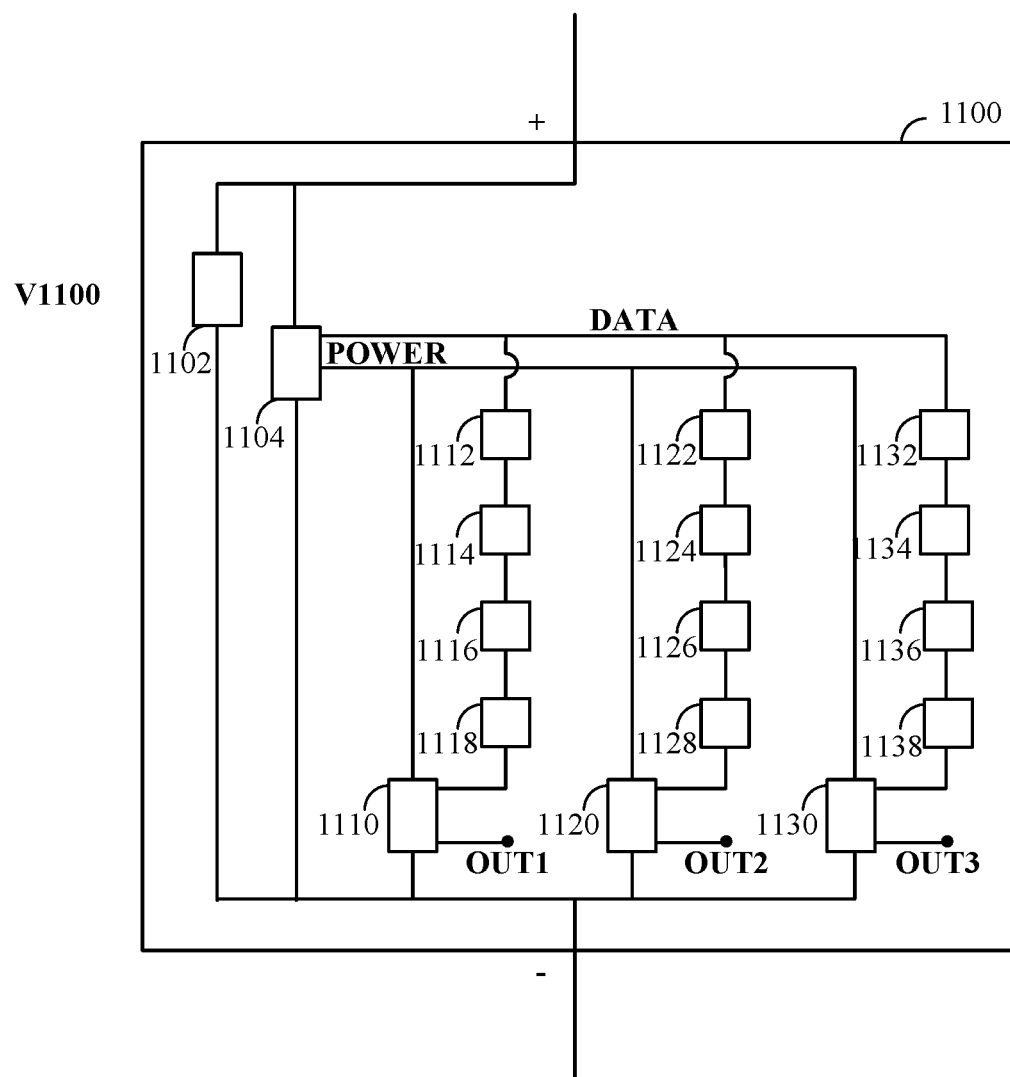
FIG. 11 shows a circuit diagram of a load element comprising a number of processor cores and programmable delay elements, according to an embodiment.

FIG. 11 shows a circuit diagram of a load element 1100 comprising a number of processor cores and programmable delay elements, according to an embodiment. The load element 1100 may comprise a single semiconductor die, which may be powered by a PSU or VRM as with previously described embodiments. The load element 1100 may comprise an input/output (I/O) block 1102 that manages communications with external elements, such as receiving inputs to be processed, reporting out results of computations, as well as information regarding power supply voltages for the load element 1100 and individual processor cores, to be detailed below. The processor cores may comprise microprocessors or cryptographic integrated circuits, for example, connected in parallel.

The present inventors have recognized, among other things, that the capability of managing the power consumption and computational performance of individual computing components may be of particular utility, particularly in blockchain transaction processing systems that may operate essentially continuously. The load element 1100 may thus also comprise a local controller 1104 that distributes both power and data to certain other circuit elements of the load element 1100, such as the processor cores. The I/O block 1102 and the local controller 1104 may be powered directly by the supply voltage V1100 externally provided to the load element 1100.

The ability of an electronic circuit to complete an assigned function in an allotted time span, i.e., "to close timing properly" is dependent on many variables. These may include the intended design of the circuit (i.e., circuit topology and specified device dimensions) as well as largely-unintended variations, such as process variations during manufacture, aging variations after manufacture, temperature changes during operation including both ambient temperature changes and self-heating effects, and variations in the supply voltage provided to the circuit.

The supply voltage provided to a circuit is often the dominant variable influencing the circuit's ability to close timing properly. Most integrated circuit loads are capacitive, and the speed with which capacitive loads may be made to change voltage state depends on the currents that may be provided to them. Such currents are generally provided by transistors. The conductivity of a transistor may vary strongly with the voltages applied to the transistor. Higher voltages may cause the transistor to become more conductive, i.e., "turn on" more strongly, enabling higher currents to be provided.

Thus, an electronic circuit that is "starved" for voltage, i.e., provided with an inadequate supply voltage, will tend to operate more slowly and thus have more difficulty completing a function within an allotted time span. The I/O block 1102 and the local controller 1104 are thus typically powered directly by the voltage V1100 externally provided to the load element 1100, to ensure they operate as quickly as possible.

In contrast, the local controller 1104 may provide a lower supply voltage to certain other circuit elements in the load element 1100. For example, if the vast majority of the circuit elements in the load element 1100 comprise processor cores, then most of the power dissipated by the load element 1100 may dissipated by those processor cores. A basic tradeoff thus exists between the desire to have such processor cores perform their functions as quickly as possible and the desire to have the load element 1100 consume as little overall power as possible. The local controller 1104 may thus manage power and data to optimize this tradeoff. The local controller 1104 may comprise a VRM or other voltage regulation circuitry to govern the supply voltage or voltages provided to the processor cores of the load element 1100.

The processor cores 1110, 1120, and 1130 comprise a small number of exemplary processor cores shown for clarity, but the load element 1100 may actually have dozens or hundreds of such processor cores. Each processor core may perform a cryptographic function, such as the generation of a transform-enabled hash value, for example, which may be useful for blockchain transaction processing activities like bitcoin mining. Speed is of the essence in blockchain transaction processing.

Further, the processor cores 1110, 1120, and 1130 are shown as each having a common supply voltage provided by the local controller 1104 for clarity, but that need not be the case. The local controller 1104 may provide power and data to each processor core in the load element 1100 individually in some embodiments, or to groups of processor cores in other embodiments. For high-cost load elements 1100 having perhaps hundreds of processing cores, individual control of each processing core enables individual optimization of the speed vs. power tradeoff for each processing core. That is, power consumption is generally minimized by the local controller 1104, but only to the extent that power reduction does not interfere with acceptable computational performance. Power consumption is the dominant variable cost in a multiprocessor system used for blockchain transaction processing, but decreasing power consumption past the point where correct computational results are provided is counterproductive.

In the worst-case scenario, a given processor core may be completely non-functional for some reason, in which case it produces no output or a nonsense output. If so, the local controller 1104 may determine this situation and terminate its operations by turning off the supply voltage to such a dead processor core and/or by not sending further data to the dead processor core and ignoring any output it may generate. One way of determining whether a processor core is operating properly (i.e., delivering correct computational results within an allotted time span) is to provide specific input data to the processor core and determine whether the processor core outputs a known correct result. For example, the local controller 1104 may send processor core 1110 an input value to process, and, after an allotted time span, observe the output (shown as OUT1) generated by the processor core 1110. OUT1 is typically a string of bits, such as the transformed hash value of the input value.

In the next-worst-case scenario, a given processor core may output a correct computational result, but may require more than the full allotted time span to do so. This is most often caused by the processor being starved for supply voltage, such that its transistors are not able to turn on fully and change the state of internal capacitive loads sufficiently quickly. In this case, the best corrective action may be to increase the supply voltage to that particular processor core. For example, if the processor core 1120 runs too slowly, the local controller 1104 may increase the supply voltage provided to the processor core 1120 to help it close timing properly in the future. The question then becomes how much should the supply voltage be increased?

The present inventors have realized that it may be possible to determine how just close a given processor core is to failure to close timing properly by introducing a programmable delay in providing the processor core with an input to process, and then observing the computational result. If the processor core is just barely able to complete its computation within the allotted time span under the current operating conditions, no decrease in supply voltage or decrease in the allotted time span will be feasible. That is, if the processor core is already operating on the very edge of its power vs. results tradeoff envelope, it cannot be pushed any further without causing errors. Such a processor is at the very edge already, and may be very sensitive to any variation in operating condition that may occur (e.g., a faster clock speed, a lower supply voltage, a higher internal temperature due to changes in ambient temperature or die power dissipation, etc.). Any such variation may cause an increase in the percentage of computations performed by that processor core that contain errors.

The local controller 1104 may thus periodically or irregularly test each processor core that it controls to determine that core's sensitivity to change. The local controller 1104 may selectively enable a particular substantially fixed time delay in providing input data to a given processor core, and observe the resulting output value and compare it with a correct previously known output value. In one embodiment, a static time delay element such as 1132, 1134, 1136, and 1138 may be enabled, so that processor core 1130 does not receive its input data for processing until some time has elapsed. That is delay elements 1132, 1134, 1136, and 1138 may each be bypassed unless the local controller 1104 enables one or more of the delay elements.

In one embodiment, delay elements 1132, 1134, 1136, and 1138 may each provide similar delays, such as 5 picoseconds. In one embodiment, delay elements 1132, 1134, 1136, and 1138 may each provide successively longer delays, such as 10 picoseconds, 20 picoseconds, 40 picoseconds, and 80 picoseconds, respectively, to provide a wider selectable range of possible total delays. Any particular delay time may be designed into a given delay element to most efficiently determine how close each processor core is to the edge of timing closure. The delay values given here are merely exemplary, and may actually be selected by a circuit designer based on the normal operating speed of the load element 1100, as one of ordinary skill in the art would recognize.

The separate delay elements may each comprise delay circuitry such as an inverter pair or a number of inverter pairs in series, which take a substantially fixed time to propagate an input signal. Other known delay elements may also be used. In one embodiment, a single programmable delay element comprising a shift register or other known variable delay element may replace the separate fixed-duration delay elements shown. In one embodiment, a common programmable delay element within the local controller 1104 may provide input data delays for input data that is then routed to each processor core separately when that specific processor core is being tested.

The local controller 1104 may repeat the delay tests for a given processor core, with different delay values introduced, until it finds a particular delay that causes an error in the computational result, at a given supply voltage. This final delay value thus pushes the processor core too far, so that it cannot complete its computations correctly within the allotted time span. The previous delay value is thus an estimate of the maximum delay the processor can tolerate and still complete its computations correctly within the allotted time span, in the case of constantly increasing delays. For a doubling delay pattern, more iterations toward the best estimate may be required.

In one embodiment, the local controller 1104 may perform such maximum delay tolerance tests for each processor core and store the estimated maximum delays that each processor can tolerate at a given supply voltage. The delay tests may be performed periodically during routine operation of the load element 1100, as these tests may be more accurate than those performed when the load element 1100 is first activated.

The local controller 1104 may repeat such maximum delay tolerance tests for each processor core at a number of different supply voltages. This way, the local controller 1104 will have data indicating the relative impact that changes to supply voltage will have upon each processor core. Embodiments may also test processor cores in groups, to gather supply voltage sensitivity data faster.

In one embodiment, all functional processor cores may operate at a single common clock frequency (and a common supply voltage), such as the maximum clock frequency that the slowest processor core can use and still produce correct results. However, such a synchronous arrangement may not yield the global optimum value of computational output per power dissipation for the entire load element 1100. The local controller 1104 may take various corrective actions to optimize the operation of the load element 1100.

In one embodiment, if there are only a few processor cores that are significantly slower than the rest, the local controller 1104 may elect to idle those slow processor cores so that the remaining processor cores may be operated at a faster clock speed. In such case, the larger number of faster processor cores may make up for the lost computational contribution the slower processor cores would have made. If not, the convenience of a common clock speed and synchronous outputs may outweigh the slight loss of efficiency that might be achieved via more complicated management schemes.

In one embodiment, the local controller 1104 may instead elect to vary the supply voltage provided to each processor core or at least groups of processor cores (e.g., with slower processor cores getting higher supply voltages to speed them up). In such case, the slightly higher power dissipation due to those processor cores that use somewhat higher supply voltages may be compensated for by the slightly lower power dissipation due to those processor cores that can use somewhat lower supply voltages and still produce error-free results. This approach requires that the local controller 1104 may output a variety of power supply voltages to particular processor cores or groups of processor cores. The local controller 1104 may define multiple supply voltage domains and assign different processor cores to each domain to keep the overall load element 1100 performance near optimum. Alternatively, the local controller 1104 may increase the supply voltage provided to all of the processor cores; this simpler approach is again probably not optimal.

In the most general case, the local controller 1104 may flexibly vary both supply voltages and clock speeds to keep each processor core operating at peak efficiency, i.e., at the highest available speed and lowest acceptable supply voltage, and at or below a maximum acceptable error rate. In some computational scenarios, any errors are unacceptable, but in other scenarios the occasional incorrect result may not be fatal, so the acceptable error rate is not necessarily zero.

The local controller 1104 may send a signal to the I/O block 1102 describing the overall state of affairs for the load element 1100. That is, the local controller 1104 may note that all available processor cores are being pushed to the edge of the speed/error/power envelope, as determined by ongoing individualized processor core delay testing. Or, the local controller 1104 may acknowledge that it is running all or nearly all of its functioning processor cores at a common maximum clock speed possible given the available power supply voltage, though the performance of the load element 1100 may be limited by the single slowest active processor core under such circumstances. Or, the local controller 1104 may report that it is managing a number of supply voltage domains, if it has that capability, to keep the processor cores performing as well as possible. Or, if the load element 1100 is not operating at capacity, the local controller 1104 may indicate that it has a number of processor cores ready for more input data to process, so that the load element 1100 can take on more of the computational workload that a larger system may have available.

The present inventors envision that a processing system may comprise multiple circuit boards, each of which may comprise multiple integrated circuit packages, each of which may comprise multiple integrated circuit dies therein. Computational workload may be balanced within each integrated circuit die by the local controller 1104 as previously described, but similar "regional" controllers may also balance workload within a given multi-die integrated circuit package or with a given circuit board or set of circuit boards using embodiments similar to those described for the single-die implementations. The different controllers may assist the overall system stay maximally productive (producing the most error-free computations as quickly as possible) and minimally consumptive (using the least overall supply power).

Figure 12:
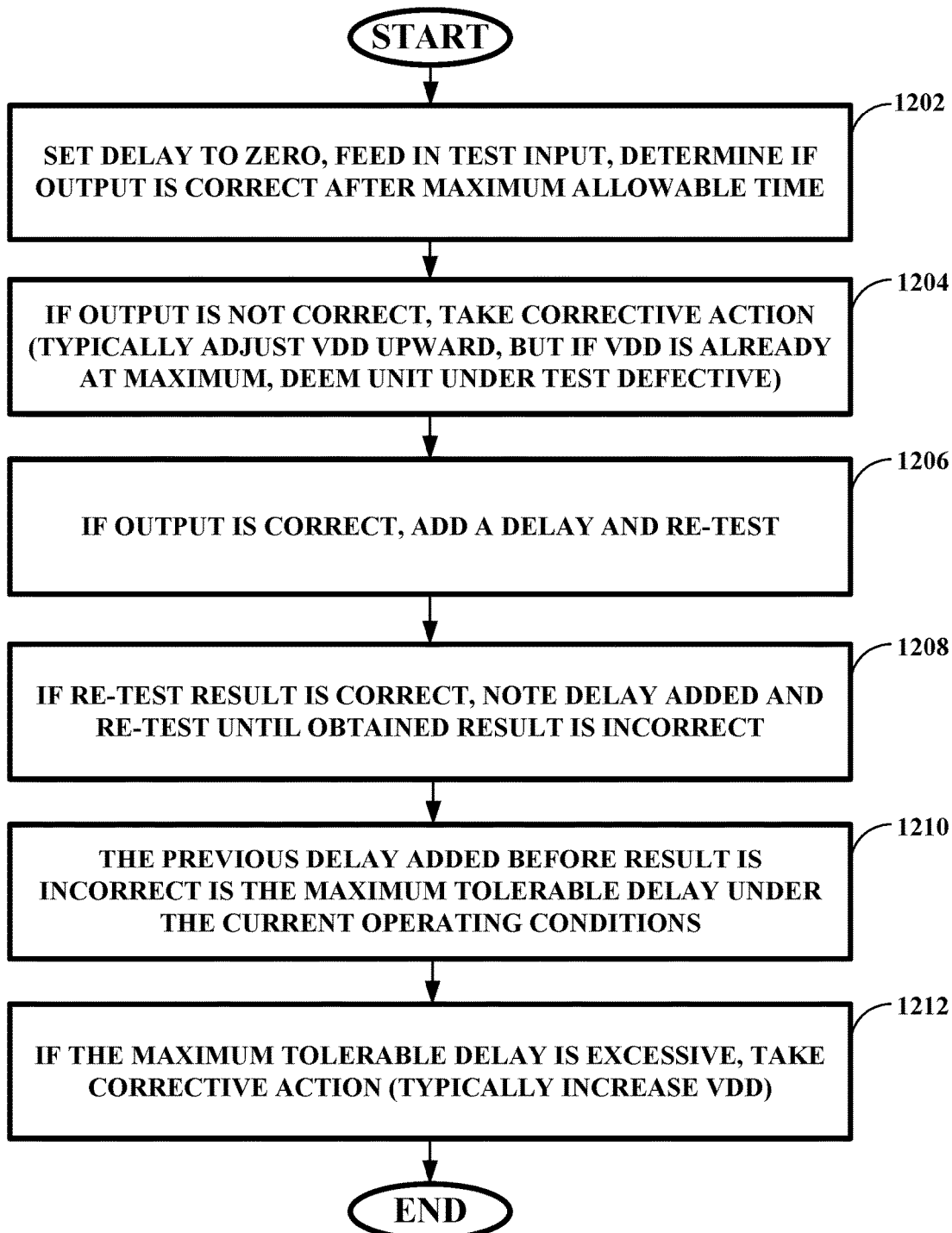
FIG. 12 shows a flowchart of a load element power management methodology, according to an embodiment.

FIG. 12 shows a flowchart 1200 of a load element power management methodology, according to an embodiment. This flowchart summarizes the delay testing process described above, which may be performed by the local controller 1104 by either enabling various delay elements and processor cores directly, or by a processor that implements instructions to evaluate processor cores and their delay time tolerances.

At 1202, the local controller 1104 may set the delay elements to produce zero or near-zero delay in propagating input data to a number of processor cores. The local controller 1104 may then introduce a test value for the processor cores to process. After a maximum allowable time has elapsed (i.e., operating at the lowest allowable clock frequency), the local controller 1104 may compare the computed output with a known correct output to determine if the respective processor core is capable of producing error-free results under even the most lax of timing constraints.

At 1204, if the computed output is not correct, the local controller 1104 may determine that a particular processor core is not capable of producing correct results, particularly if the supply voltage provided to the particular processor core is at its maximum. If a higher supply voltage can be provided to the processor core, the local controller 1104 may repeat the test at a higher supply voltage to determine if the processor core is operable at least at such higher supply voltage. If the test results are negative, the local controller 1104 may deem that particular processor core to be non-functional. The local controller 1104 may stop sending it input data to process, and may (if capable) de-power that particular processor entirely. The local controller 1104 may output a status message indicating how many working and how many defective processor cores are within is control.

At 1206, if the processor core yielded a computed output that matches the known correct output value, the local controller 1104 may repeat the functionality test after introducing a delay. At 1208, the local controller 1104 may introduce a different delay and repeat the functionality test again. Typically, such repeated tests will systematically increase the delay to determine the maximum delay value that still yields correct results, although a binary search pattern for the maximum delay value may also be used.

At 1210, the local controller 1104 may introduce a delay that causes the processor core to produce incorrect computational results, i.e., fail to close timing properly. This result indicates that the local controller 1104 has exceeded the maximum tolerable delay value. In the case of a systematically increasing time delay, the previous time delay value is the best estimate for the maximum tolerable delay value. In the case of a binary search patterned delay value, the local controller 1104 may back up to the previous delay value and, if possible, increment a finer delay resolution to more closely iterate toward the maximum tolerable delay value.

At 1212, the local controller 1104 may elect to increase the supply voltage for a given processor core or group of processor cores being tested, to determine if an increased supply voltage will help increase the speed at which correct values may be computed. The local controller 1104 may also elect to decrease the supply voltage for a given processor core or group of processor cores being tested, to determine how much "slack" there is, i.e., how much the supply voltage can be reduced for processor cores that are faster than expected. Ideally, all processor cores are fully functional at the lowest possible supply voltage, so the load element 1100 can produce error-free results with the lowest power dissipation. The local controller 1104 may store the testing results for use in a management model that guides corrective actions to best approximate the ideal performance of the load element 1100 given its actual functional behavior.

Figure 13:
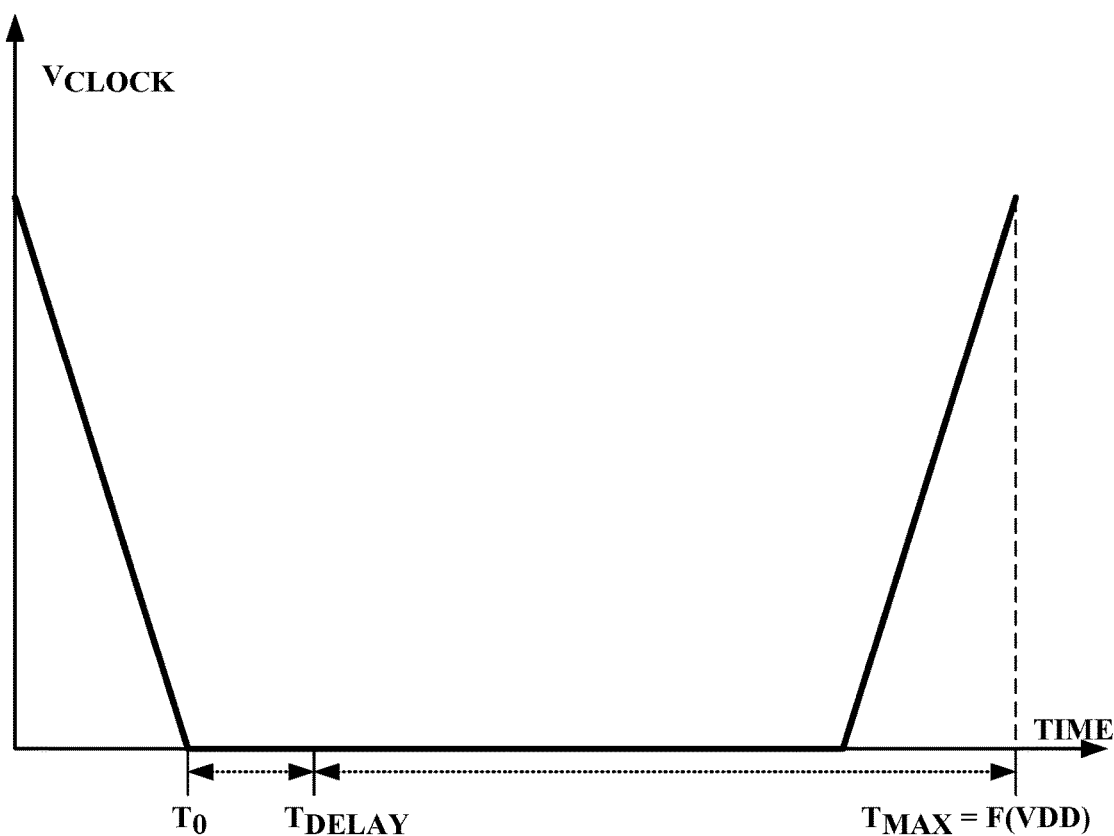
FIG. 13 shows a clock signal waveform that is adjustable, according to an embodiment.

FIG. 13 shows a clock signal waveform 1300 that is adjustable, according to an embodiment. At time value $T_0$, the local controller may send out an input value to be processed by a given processor core or group of processor cores, as denoted by a clock transition. Time value $T_{MAX}$ is the maximum time allotted for a processor core or group of processor cores to output computational results of processing the input value. This maximum time may correspond to the slowest allowable speed at which load element 1100 is designed to operate, and is denoted by a second clock transition.

If no delay elements are enabled, the processor cores involved will have a time span of $(T_{MAX}-T_0)$ to produce correct computational results, under the most lax timing constraints. If delay elements are enabled, a selected propagation delay $T_{DELAY}$ is imposed, so that the processor cores involved will have less remaining time to produce correct computational results before the $T_{MAX}$ deadline. Repeated tests as described above may estimate the maximum tolerable delay for a variety of operational conditions. The supply voltage $V_{DD}$ is typically the dominant factor in determining the maximum tolerable delay, but ambient temperature and power dissipation and other factors may also be relevant.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, programmable logic arrays (PLAs), programmable array logics (PALs), complex programmable logic devices (CPLDs), FPGAs, logical components, software routines or other mechanisms might be implemented to make up a component. Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or AHDL), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 11. Various embodiments are described in terms of this example-computing component 1100. After reading this description, it will become apparent to a person skilled in the relevant art how to implement the technology using other computing components or architectures.

Figure 14:
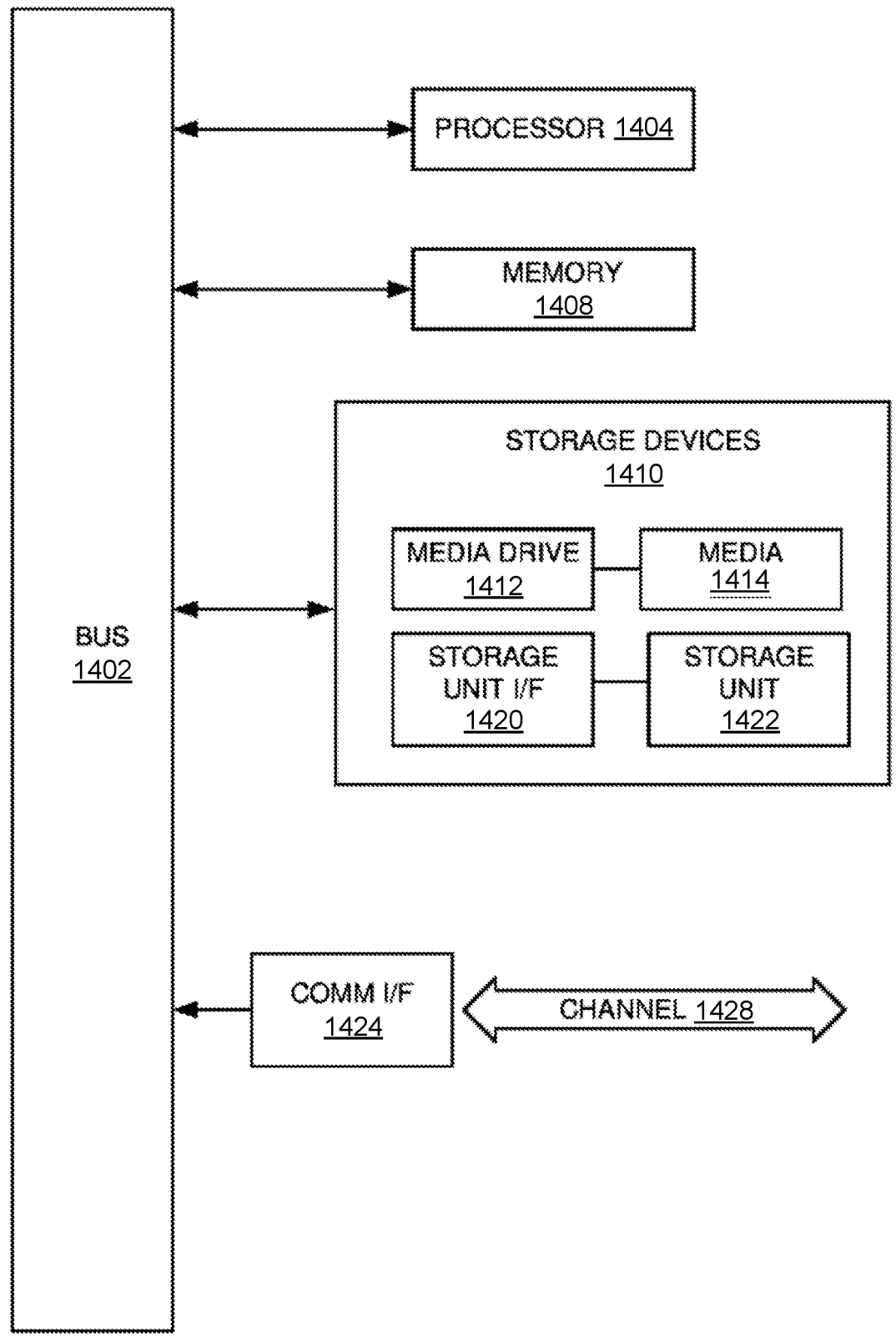
FIG. 14 shows a computing component that may carry out the functionality described herein, according to an embodiment.

FIG. 14 shows a computing component 1400 that may carry out the functionality described herein, according to an embodiment. Computing component 1400 may represent, for example, computing or processing capabilities found within desktop, laptop and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. Computing component 1400 might also represent computing capabilities embedded within or otherwise available to a given device. For example, a computing component might be found in other electronic devices such as, for example, digital cameras, navigation systems, cellular telephones, portable computing devices, modems, routers, wireless application protocols (WAPs), terminals and other electronic devices that might include some form of processing capability.

Computing component 1400 might include, for example, one or more processors, controllers, control components, or other processing devices, such as a processor 1404. Processor 1404 might be implemented using a special-purpose processing engine such as, for example, a microprocessor, controller, or other control logic. In the illustrated example, processor 1404 is connected to a bus 1402, although any communication medium can be used to facilitate interaction with other components of computing component 1400 or to communicate externally.

Computing component 1400 might also include one or more memory components, simply referred to herein as main memory 1408. For example, random access memory (RAM) or other dynamic memory, might be used for storing information and instructions to be executed by processor 1404. Main memory 1408 might also be used for storing temporary variables or other intermediate information during execution of instructions to be executed by processor 1404. Computing component 1400 might likewise include a read only memory (ROM) or other static storage device coupled to bus 1402 for storing static information and instructions for processor 1404.

The computing component 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a compact disc (CD) or digital versatile disc (DVD) drive (read-only or read/write), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing component 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory component) and memory slot, a personal computer memory card international association (PCMCIA) slot and card, and other fixed or removable storage units 1422 and interfaces 1420 that allow software and data to be transferred from the storage unit 1422 to computing component 1400.

Computing component 1400 might also include a communications interface 1424. Communications interface 1424 might be used to allow software and data to be transferred between computing component 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1414 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard,"

"known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for actively controlling power in a series string load, the apparatus comprising:
   a power supply unit (PSU) providing a DC output voltage;
   the series string load, comprising a plurality of load sub-strings, each sub-string comprising one or more load elements connected to each other in series;
   a plurality of voltage regulation modules (VRMs), each VRM respectively converting an input voltage from a first input and a second input to produce an output voltage at an output to supply a respective one of the plurality of load sub-strings connected between the output and the second input of each VRM, wherein the respective inputs of the plurality of VRMs are connected together in series with the PSU; and
   a central controller that receives signals from each VRM describing an output voltage applied to its respective connected load elements, and responsively transmits signals to each VRM to adjust the output voltage applied to its respective connected load elements;
   wherein at least one of the load elements comprises a plurality of processing cores connected together in parallel, wherein the central controller monitors a voltage drop across the plurality of processing cores and selectively disables or enables individual ones of the plurality of processing cores based on the monitored voltage drop to adjust a resistance of the at least one of the load elements.

2. The apparatus of claim 1 wherein the PSU comprises a personal computer power supply.

3. The apparatus of claim 1 wherein each VRM comprises a pulse wave modulation (PWM) controller, an inductor, a capacitor, a first switching device, and a second switching device, wherein the PWM controller generates control signals that alternately switch on the first switching device and the second switching device to send electrical current through the inductor to produce the output voltage, and the capacitor is connected to the output voltage.

4. The apparatus of claim 3, wherein the first switching device and the second switching device comprise metal-oxide-semiconductor field effect transistors (MOSFETs).

5. The apparatus of claim 3 wherein each VRM adjusts the output voltage applied to its respective load elements by adjusting the PWM controller, in terms of at least one of frequency and duty cycle.

6. The apparatus of claim 1 wherein the plurality of load elements comprise at least one of a light-emitting device, a microprocessor, and a cryptographic integrated circuit with a number of processing cores.

7. The apparatus of claim 1, wherein the central controller receives additional signals from communication circuits in the respective load elements describing required respective output voltages.

8. The apparatus of claim 1, wherein at least one of optocouplers and level-shifting circuits communicates the signals from each VRM to the central controller.

9. The apparatus of claim 1, wherein each load element comprises an internal controller that manages the power supplied to and the operations performed by a plurality of cryptographic integrated circuits.

10. The apparatus of claim 1, wherein the central controller controls the PSU to adjust its DC output voltage.

11. The apparatus of claim 1, wherein the central controller comprises a plurality of separate controllers.

12. A method for actively controlling power in a series string load, the method comprising:
   distributing power from a power supply unit (PSU) providing a DC output voltage to the series string load, the series string load comprising a plurality of load sub-strings, each sub-string comprising one or more load elements connected to each other in series, using a plurality of voltage regulation modules (VRMs), each VRM respectively converting an input voltage from a first input and a second input to produce an output voltage at an output to supply a respective one of the plurality of load sub-strings connected between the output and the second input of each VRM, wherein the respective inputs of the plurality of VRMs are connected together in series with the PSU;
   controlling power distribution using a central controller that receives signals from each VRM describing an output voltage applied to its respective connected load elements, and responsively transmits signals to each VRM to adjust the output voltage applied to its respective connected load elements; and monitoring, by the central controller, a voltage drop across at least one of the load elements comprising a plurality of processing cores connected together in parallel, and selectively disabling or enabling individual ones of the plurality of processing cores based on the monitored voltage drop to adjust a resistance of the at least one of the load elements.

13. The method of claim 12 wherein each VRM comprises a pulse wave modulation (PWM) controller, an inductor, a capacitor, a first switching device, and a second switching device, and further comprising generating, using the PWM controller, control signals that alternately switch on the first switching device and the second switching device to send electrical current through the inductor to produce the output voltage, and wherein the capacitor is connected to the output voltage.

14. The method of claim 13 further comprising each VRM adjusting the output voltage applied to its respective load elements by adjusting the PWM controller, in terms of at least one of frequency and duty cycle.

15. The method of claim 12, further comprising the central controller receiving additional signals from communication circuits in the respective load elements describing required respective output voltages.

16. The method of claim 12, further comprising communicating the signals from each VRM to the central controller using at least one of optocouplers and level-shifting circuits.

17. The method of claim 12, further comprising controlling the PSU with the central controller to adjust its DC output voltage.

18. The method of claim 12, wherein the central controller comprises a plurality of separate controllers.

19. A computer program product, comprising a hardware storage medium containing instructions that, when executed by a processor, cause the processor to perform operations comprising:
    distributing power from a power supply unit (PSU) providing a DC output voltage to a series string load, the series string load comprising a plurality of load sub-strings, each sub-string comprising one or more load elements connected to each other in series, using a plurality of voltage regulation modules (VRMs), each VRM respectively converting an input voltage from a first input and a second input to produce an output voltage at an output to supply a respective one of the plurality of load sub-strings connected between the output and the second input of each VRM, wherein the respective inputs of the plurality of VRMs are connected together in series with the PSU;
    controlling power distribution using a central controller that receives signals from each VRM describing an output voltage applied to its respective connected load elements, and responsively transmits signals to each VRM to adjust the output voltage applied to its respective connected load elements; and
    monitoring, by the central controller, a voltage drop across at least one of the load elements comprising a plurality of processing cores connected together in parallel, and selectively disabling or enabling individual ones of the plurality of processing cores based on the monitored voltage drop to adjust a resistance of the at least one of the load elements.

20. The computer program product of claim 19, wherein each VRM comprises a pulse wave modulation (PWM) controller, an inductor, a capacitor, a first switching device, and a second switching device, and the operations further comprise generating, using the PWM controller, control signals that alternately switch on the first switching device and the second switching device to send electrical current through the inductor to produce the output voltage, and wherein the capacitor is connected to the output voltage.

21. The computer program product of claim 20, the operations further comprising each VRM adjusting the output voltage applied to its respective load elements by adjusting the PWM controller, in terms of at least one of frequency and duty cycle.

22. The computer program product of claim 19, the operations further comprising the central controller receiving additional signals from communication circuits in the respective load elements describing required respective output voltages.

23. The computer program product of claim 19, the operations further comprising communicating the signals from each VRM to the central controller using at least one of optocouplers and level-shifting circuits.

24. A system for actively controlling power in a series string load, the system comprising:
    means for supplying power, providing a DC output voltage;
    the series string load, comprising a plurality of load sub-strings, each sub-string comprising one or more load elements connected to each other in series;
    a plurality of means for regulating voltage, each means for regulating voltage respectively converting an input voltage from a first input and a second input to produce an output voltage at an output to supply a respective one of the plurality of load sub-strings connected between the output and the second input of each means for regulating voltage, wherein the respective inputs of the plurality of means for regulating voltage are connected together in series with the means for supplying power; and
    means for controlling that receives signals from each means for regulating voltage describing an output voltage applied to its respective connected load elements, and responsively transmits signals to each means for regulating voltage to adjust the output voltage applied to its respective connected load elements;
    wherein at least one of the load elements comprises a plurality of processing cores connected together in parallel, wherein the means for controlling monitors a voltage drop across the plurality of processing cores and selectively disables or enables individual ones of the plurality of processing cores based on the monitored voltage drop to adjust a resistance of the at least one of the load elements.

* * * * *